United States Patent [19]

Hunt

[11] Patent Number: 4,943,106
[45] Date of Patent: Jul. 24, 1990

[54] TRAILER HAVING SWING-OUT SIDE EXTENSIONS

[75] Inventor: William K. Hunt, Mitchell, S. Dak.

[73] Assignee: Dakota Manufacturing Co., Inc., Mitchell, S. Dak.

[21] Appl. No.: 383,669

[22] Filed: Jul. 24, 1989

[51] Int. Cl.⁵ .............................................. B62D 33/02
[52] U.S. Cl. ..................................... 296/26; 296/182; 280/656
[58] Field of Search ........................ 296/182, 204, 26; 280/656, 789

[56] References Cited

U.S. PATENT DOCUMENTS

| | | | |
|---|---|---|---|
| 2,717,802 | 9/1955 | Martin | 296/182 |
| 3,330,574 | 7/1967 | Kulyk | 280/656 |
| 4,397,498 | 8/1983 | Joynt et al. | 296/26 |
| 4,570,967 | 2/1986 | Allnutt | 280/656 |

Primary Examiner—Robert R. Song
Attorney, Agent, or Firm—Zarley, McKee, Thomte, Voorhees & Sease

[57] ABSTRACT

An equipment trailer having swing-out side extensions provided at each side thereof to enable the overall width of the trailer to be increased when over-width loads are to be carried. Each of the side extensions comprises a plurality of elongated arms pivotally mounted at their inner ends to a side frame member of the trailer and having a vertically disposed rail member pivotally secured to the outer ends thereof. All of the extension arms may be pivotally moved to their outer position by simply grasping the rail member and pivotally moving the same between its inner and outer positions. Locks are provided for locking the side extensions in their inner and outer positions. A modified form of the invention is also shown wherein a hydraulic cylinder is utilized to pivotally move the side extensions.

3 Claims, 5 Drawing Sheets

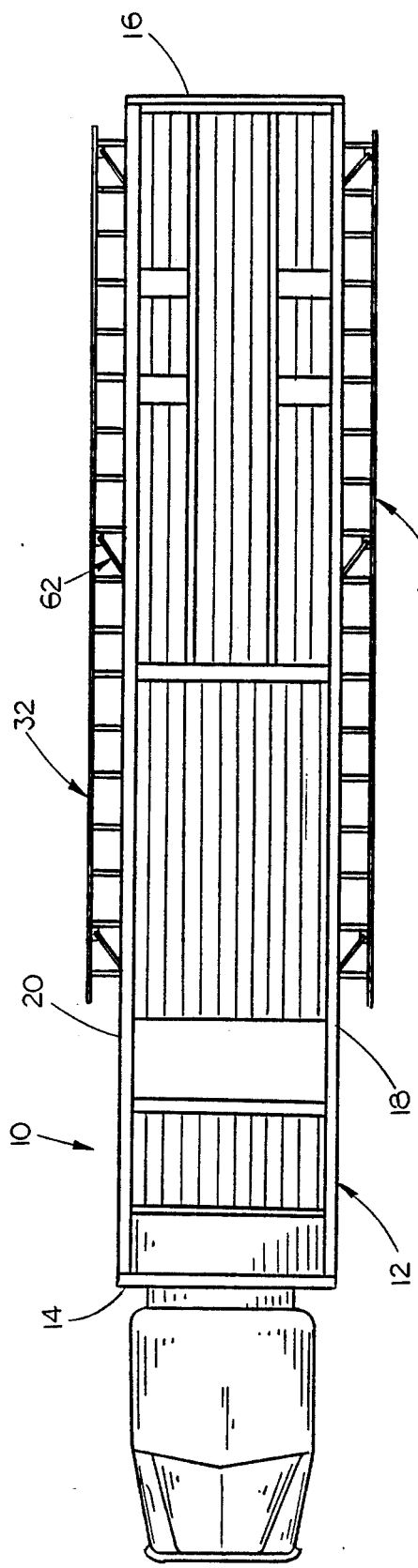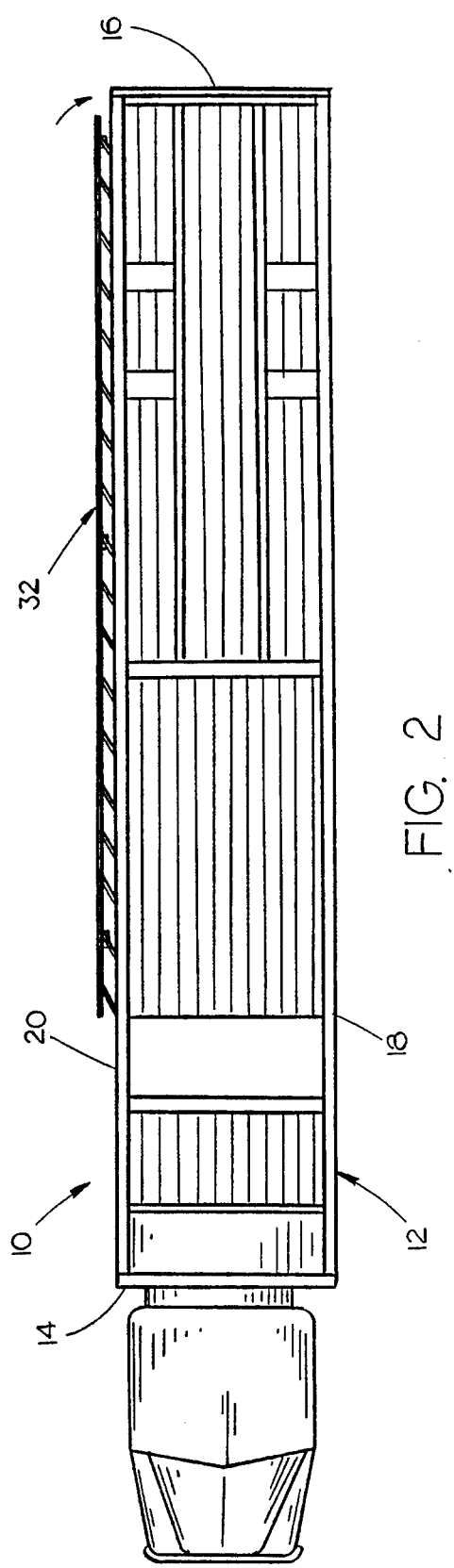

TRAILER HAVING SWING-OUT SIDE EXTENSIONS

BACKGROUND OF THE INVENTION

Over-the-road cargo trailers normally include an elongated wheeled frame means comprising at least a pair of longitudinally extending frame members having a bed or deck positioned thereon and extending therebetween. It is frequently desirable to increase the width of the trailer bed or deck and the prior art has previously described side extensions for performing that task. The prior art side extensions normally are comprised of a plurality of individual members which may be pivotally moved from a position closely adjacent the outer side of the trailer frame to an extended position wherein the extensions are substantially transversely disposed with respect to the longitudinal axis of the trailer. Although the prior art extensions have performed generally satisfactorily, it is necessary to individually position each extension in its "out" or "in" position.

It is believed that some attempts have been made to interconnect the individual extensions in a "gang" fashion so that all of the extensions may be simultaneously pivoted from their "in" to their "out" positions and vice versa. It is believed that the prior art attempts to "gang" attach the individual extensions has involved elaborate structures connected to the interior frame of the trailer and such elaborate structure is believed to have interfered with the normal use of the trailer.

It is therefore a principal object of the invention to provide a trailer having swing-out side extensions at the opposite sides thereof.

A further object of the invention is to provide an improved side extension utilizing a gang swing-out side extension.

Yet another object of the invention is to provide a gang swing-out side extension for a trailer which is attached to the exterior of the trailer frame.

Still another object of the invention is to provide a gang swing-out side extension for a trailer which utilizes a minimal amount of closure retaining locks.

Still another object of the invention is to provide a gang swing-out side extension for a trailer which minimally interferes with other trailer uses.

Still another object of the invention is to provide a gang swing-out side extension for a trailer which does not interfere with the use of the stakepockets or with the tie-down rings attached to the trailer.

Still another object of the invention is to provide a gang swing-out side extension for a trailer which permits the same to be extended and retracted in a convenient fashion.

Yet another object of the invention is to provide a gang swing-out side extension for a trailer which is economical of manufacture, durable in use and refined in appearance.

These and other objects will be apparent to those skilled in the art.

BRIEF DESCRIPTION OF THE DRAWINGS

FIG. 1 is a top view of the trailer of this invention with the side extensions in their "out" position;

FIG. 2 is is a view similar to FIG. 1 except that one of the side extensions has been pivotally moved to its "in" position with the other side extension having been partially moved towards its inner position;

SUMMARY OF THE INVENTION

Figure 3:
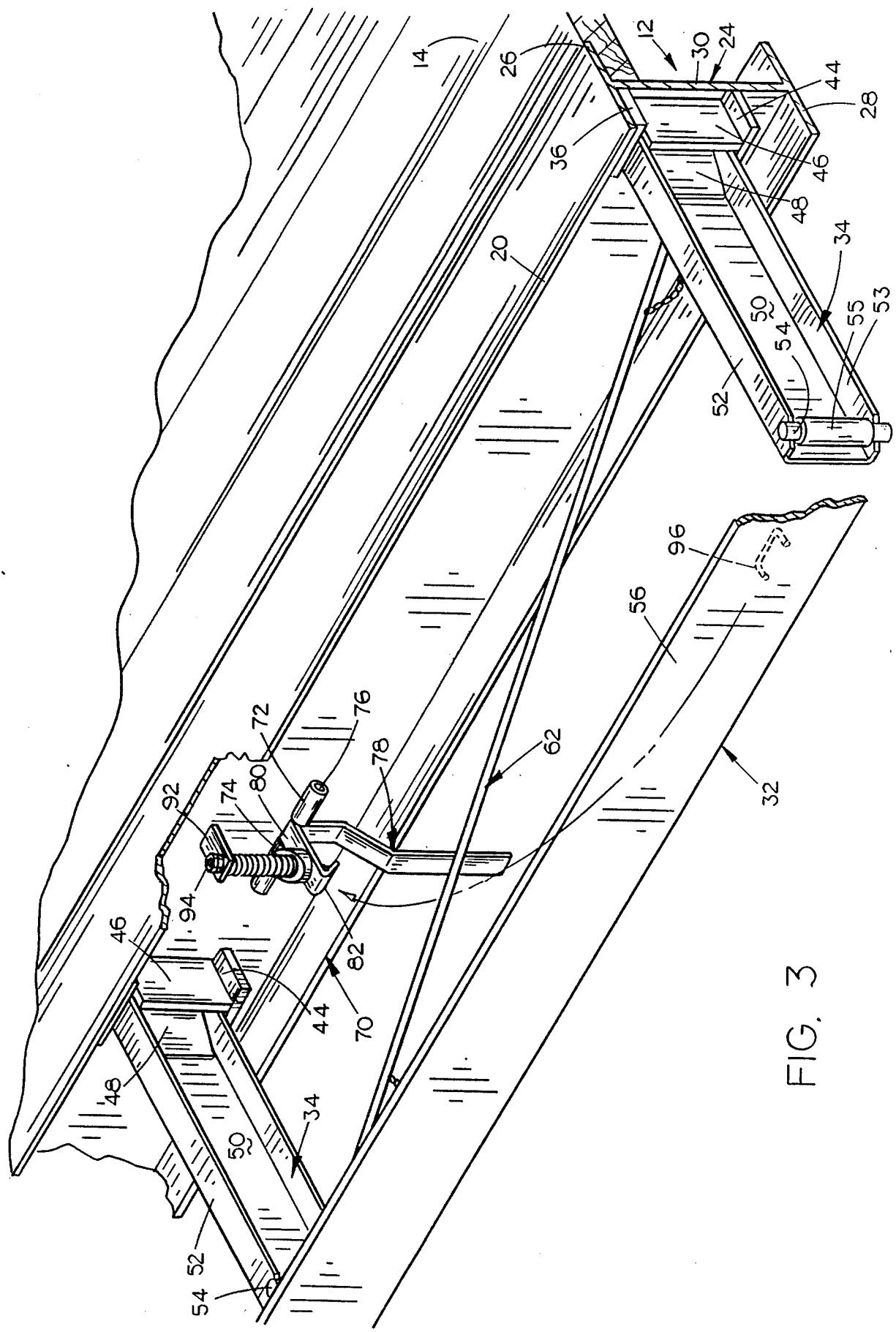
FIG. 3 is a partial front perspective view of the swing-out side extension at the right side of the trailer.
Figure 4:
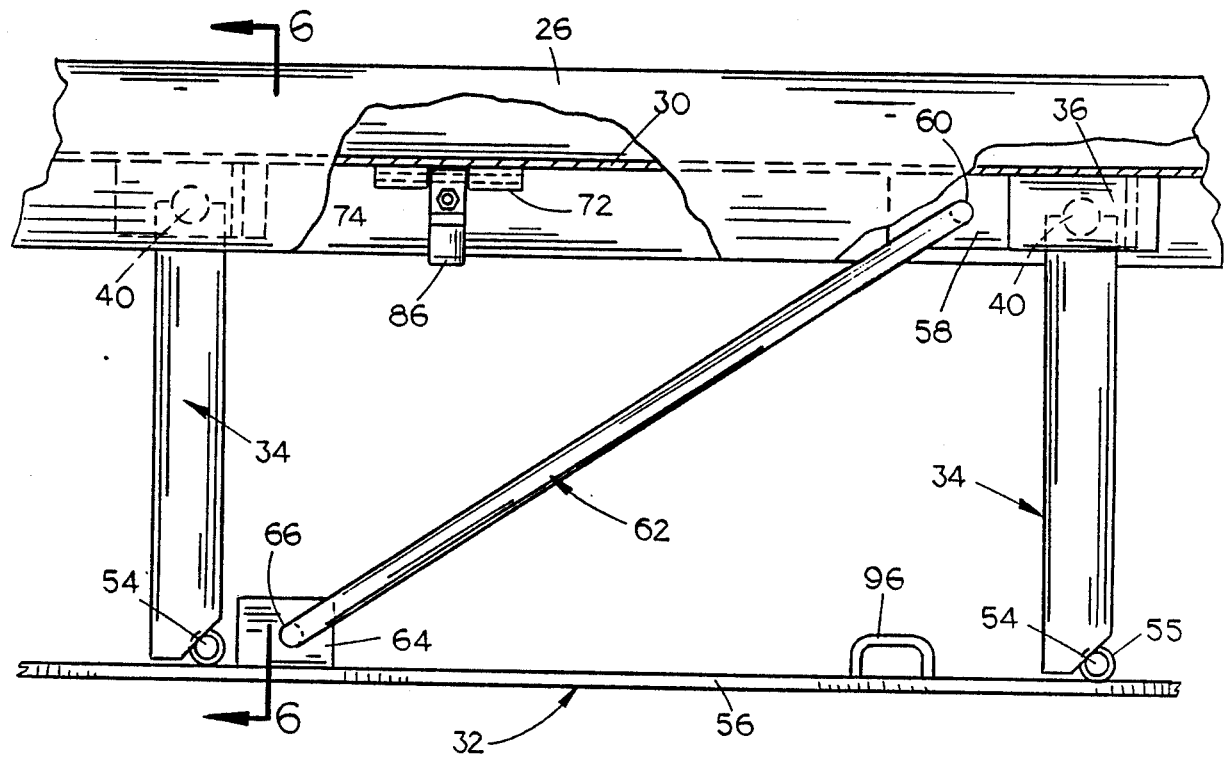
FIG. 4 is a partial top elevational view of the structure of FIG. 3 with portions thereof cut away to more fully illustrate the invention.
Figure 5:
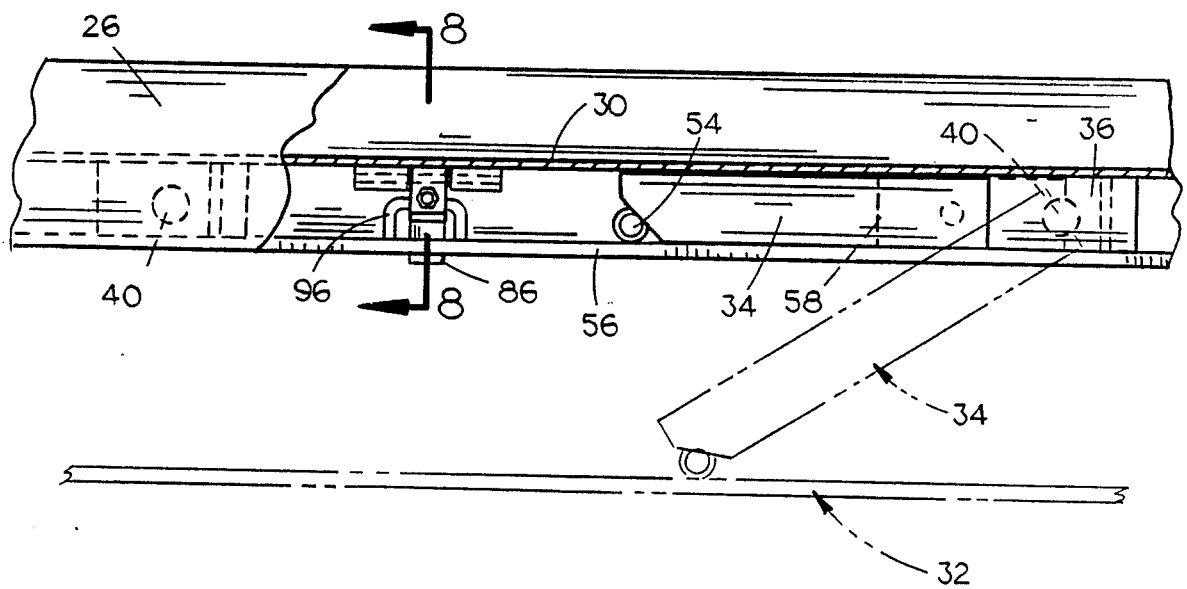
FIG. 5 is a view similar to FIG. 4 except that the side extension has been pivotally moved to its "in" position.

A gang swing-out side extension is described for attachment to opposite sides of a cargo or equipment trailer so as to provide additional load width carrying capabilities thereof. The frame of the trailer includes longitudinally extending side frame members to which the side extensions of the invention are pivotally attached. Each of the side extensions comprises a plurality of supports or arms which are pivotally connected at their inner ends to the associated side frame member. An elongated rail member is pivotally connected to the outer ends of the supports so as to operatively interconnect each of the supports. The supports at each side of the trailer may be moved in unison or in a gang fashion by simply grasping the rail member and pivotally moving the supports from their closed "in" position to their open "out" position. Locking means is provided for locking each of the extension assemblies in their "in" and "out" positions. A modified form of the invention is also illustrated which shows a hydraulic cylinder means for pivotally moving the extensions from their "in" to "out" positions and vice versa.

DESCRIPTION OF THE PREFERRED EMBODIMENT

The numeral 10 refers generally to a conventional cargo or equipment trailer including a wheeled frame means 12 having a forward end 14, rearward end 16, and opposite sides 18 and 20. Wheeled frame means 12 includes longitudinally extending side frame members 22 (not shown) and 24 each of which comprises a top flange 26, bottom flange 28 and web 30 extending therebetween. The numerals 32 and 32' refer to the side extensions which are positioned at opposite sides of the trailer and which are identical. Inasmuch as extensions 32 and 32' are identical, only extension 32 will be described with "'" indicating identical structure on assembly 32'. Extension assembly 32 is secured to the exterior surface of web 30 as will now be described.

Figure 6:
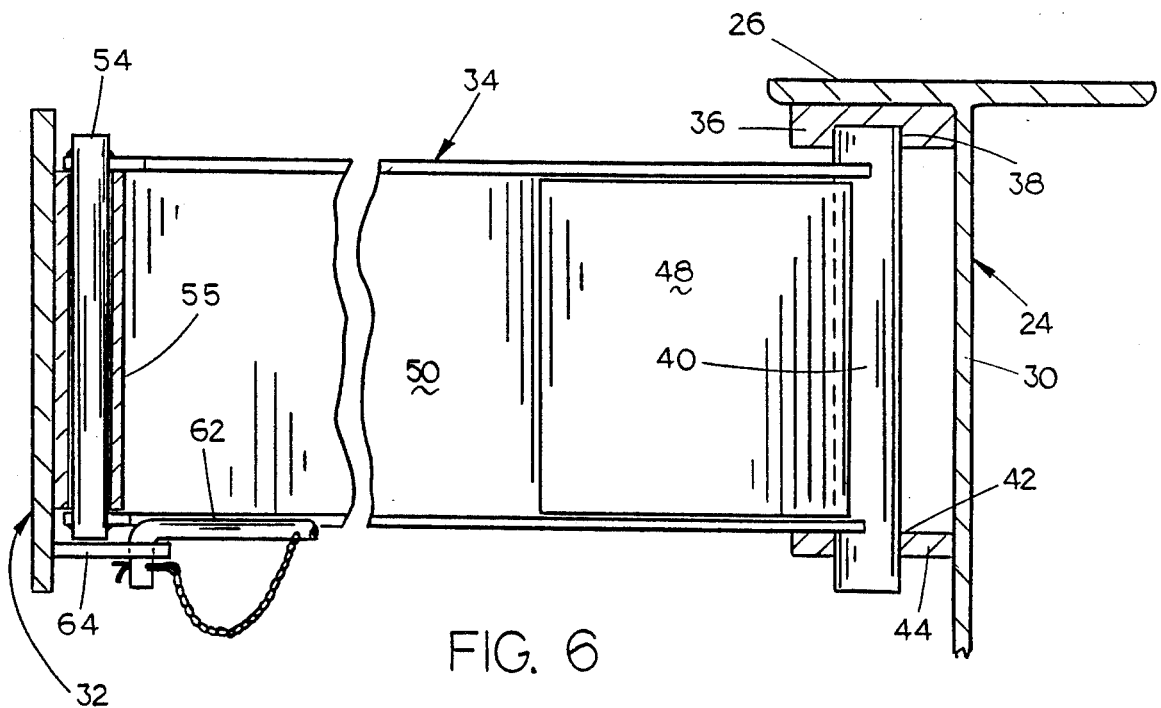
FIG. 6 is an enlarged sectional view as seen on lines 6—6 of FIG. 4.

A plurality of support arms 34 are operatively pivotally connected at their inner ends to side frame member 24 as will now be described. Plate 36 is welded to the underside of top flange 26 and the upper end of web 30 as seen in FIG. 6 and has an opening 38 formed therein which receives one end of a pin 40. The lower end of pin 40 extends through an opening 42 in plate 44 which is welded to web 30 as seen in the drawings. A vertically disposed plate 46 is secured to and extends between the plates 36 and 44 inwardly of one end thereof as seen in FIG. 3.

One end of the associated C-shaped support arm 34 is welded to pin 40 between the plates 36 and 42. Plate 48 is welded to pin 40 and to the web 50 of arm 34 as seen in FIG. 6. The engagement of plate 46 with arm 34 limits the pivotal movement of the arm 34 with respect to the side frame member 22.

The outer ends of flanges 52 and 53 of arm 34 are chamfered at a 45° angle and have shaft 54 welded thereto. Tube or pipe 55 is rotatably mounted on the shaft 54 between the flanges 52 and 53 of support arm 34. A vertically disposed continuous rail member 56 is welded to the pipes 55 on each of the support arms 34 as seen in the drawings. The relationship of the rail member 56 with respect to the pipe 55 and the outer ends of the support arm 34 is such that the rail member 56 engages the outer end of the support arm 34 when the support arms 34 are in their "out" position so as to limit the swinging movement of the support arms 34.

Plate 58 is welded to web 30 of side frame member 22 laterally of the inner end of the support arm 34 and has an opening 60 formed therein which is adapted to receive one end of the retaining or locking arm 62. Plate 64 is welded to the inner surface of rail member 56 and has an opening 66 formed therein adapted to receive the other end of the retaining arm 62. The downwardly depending legs of the retaining arm 62 are provided with openings formed therein so as to permit the insertion of a cotter key therein to maintain the retaining arm 62 in position. Retaining arm 62 serves to lock or maintain the associated support arm 34 in its "out" position. It is not necessary to utilize a retaining arm 62 for each of the support arms 34 although it is preferred that at least three retaining arms 62 be utilized on each of the side extensions.

Thus, the support arms 34 at one side of the trailer may be moved in unison or in a gang fashion by simply grasping the rail member 56 and pivotally swinging all of the associated support arms 34 between their closed "in" position and their open "out" position. When the support arms 34 are in their "in" position, rail member 56 is received between the top and bottom flanges of the side frame member 22 (FIG. 8) so as not to increase the effective width of the trailer when the side extensions are not being utilized. Further, the positioning of the support arms 34 and the rail member 56 between the top and bottom flanges of the frame member 22 as described and the longitudinal positions of the same ensures that the assembly will not interfere with the normal usage of the conventional D-rings, stakepockets, etc. Further, the mounting of the support arms at the exterior surfaces of the side frame members provides a much more convenient method of fabricating the assembly.

With the rail member 56 in its "out" position, it is recommended that planks or the like be positioned on the upper surface of the support arms 34 thereby increasing the effective width of the trailer when an overwidth load is being transported.

It is recommended that approximately three locking devices 70 be provided along each of the side frame members 22 and 24 to lock the extension assembly in its "in" position. Each of the locking devices 70 comprises a pair of tubes 72 and 74 which are welded to web 30 of the associated side frame member. Shaft 76 is rotatably mounted in pipes 72 and 74 and has the locking arm 78 welded thereto as seen in the drawings.

Figure 7:
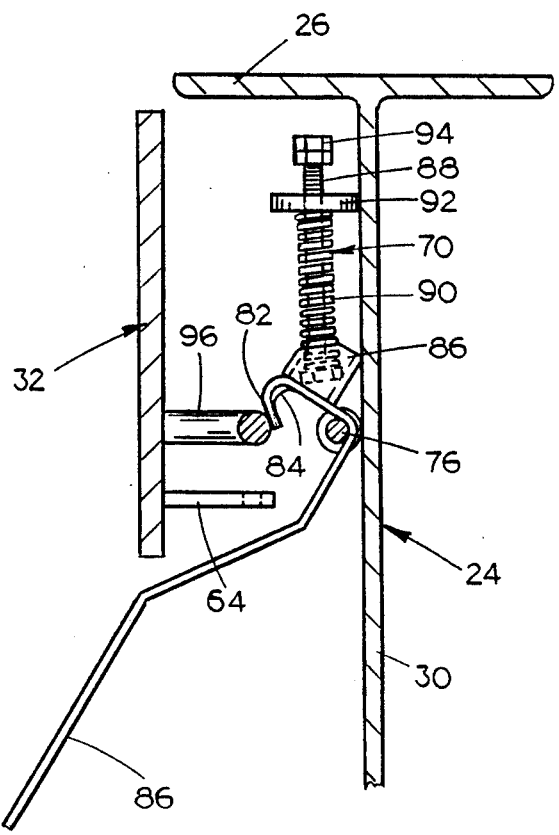
FIG. 7 is a sectional view illustrating the manner in which the side extension engages one of the locking elements.
Figure 8:
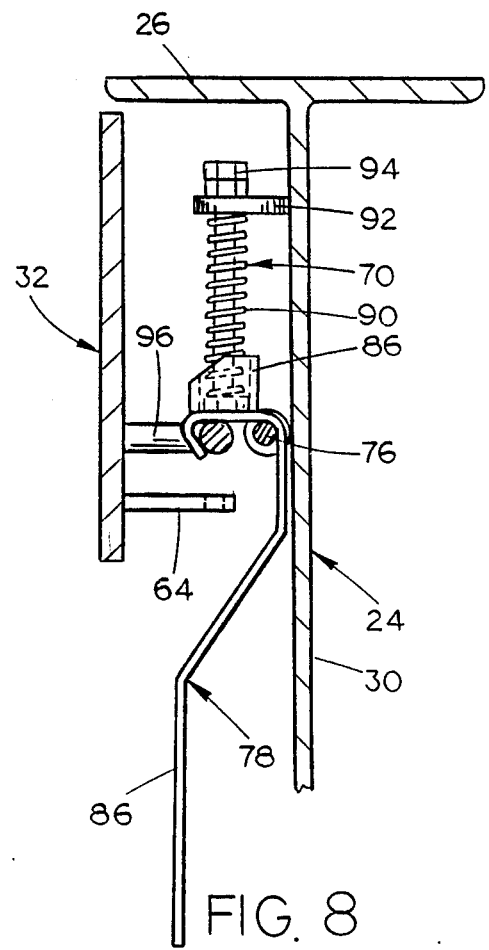
FIG. 8 is a sectional view as seen on lines 8—8 of FIG. 5 illustrating the side extension in its locked position.

Locking arm 78 includes a horizontally disposed upper end 80 and an inclined outer end portion 82. A filet weldment 84 is provided at the inner surface of the inclined portion 82 as seen in FIGS. 7 and 8. As seen in FIGS. 7 and 8, locking arm 78 has a lower end portion 86 which is normally spaced outwardly of web 30. Pipe 86 is welded to the upper surface of upper end 80 and receives the lower end of a bolt 88 having spring 90 mounted thereon. The upper end of bolt 88 extends through plate 92 and is secured in position by means of nut 94. Thus, spring 90 yieldably maintains the locking arm 78 in the position seen in FIG. 8.

A lock loop 96 is welded to rail member 56 laterally of each of the locking devices and is designed to be received behind or inwardly of the inclined outer end portion 82 when the extension assembly is in its locked "in" position (FIG. 8). As rail member 56 is pivotally moved to its "in" position (FIG. 7), the loop 96 engages the inclined outer end portion 82 and causes the locking arm 78 to pivot in a clockwise direction so that the loop 96 can pass beneath the lower end of the inclined outer portion 82. As soon as loop 96 passes behind or inwardly of the inclined outer end portion 82, spring 90 causes the locking arm 78 to pivotally move in a counterclockwise direction to lock the loop 96 behind or inwardly of the inclined outer end portion 82.

When it is desired to move the extension arm assembly to its "outer" position, the operator simply unlocks each of the locking loops 96 from its associated locking device as follows. The operator grasps the lower end 86 of the locking arm 78 and pulls the same outwardly from the trailer or pivotally moves the locking arm 78 in a clockwise direction against the resiliency of the spring 90 until the loop 96 is free of engagement with the inclined outer end portion 82. When loop 96 is disengaged from the outer end portion 82 of the locking arm 78, the operator releases the locking arm 78 and goes to the remaining locking devices wherein the procedure is repeated.

When the locking devices have been unlocked, the rail member 56 is pivotally moved to its outer position. The retaining arms 62 are then secured to the plates 58 and 64 as previously described.

Figure 10:
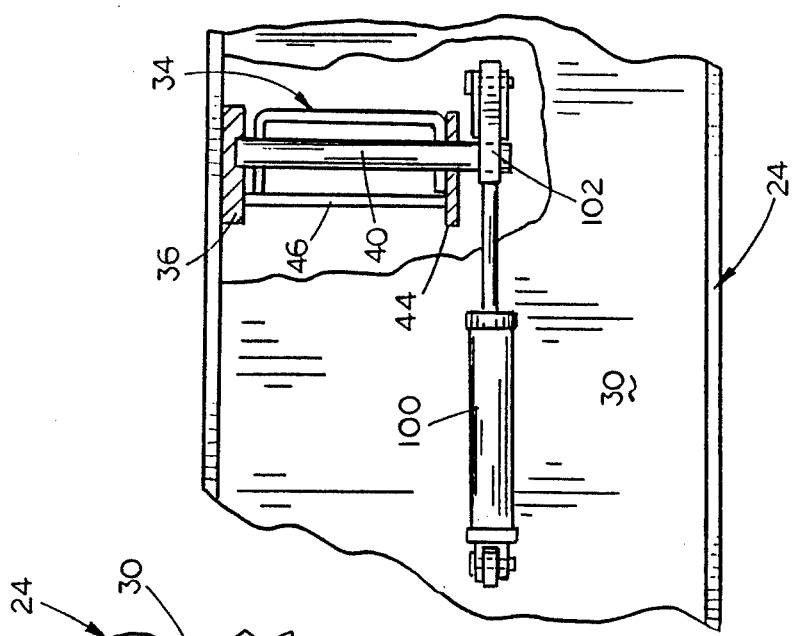
FIG. 10 is a partial top view of the structure of FIG. 9.
Figure 9:
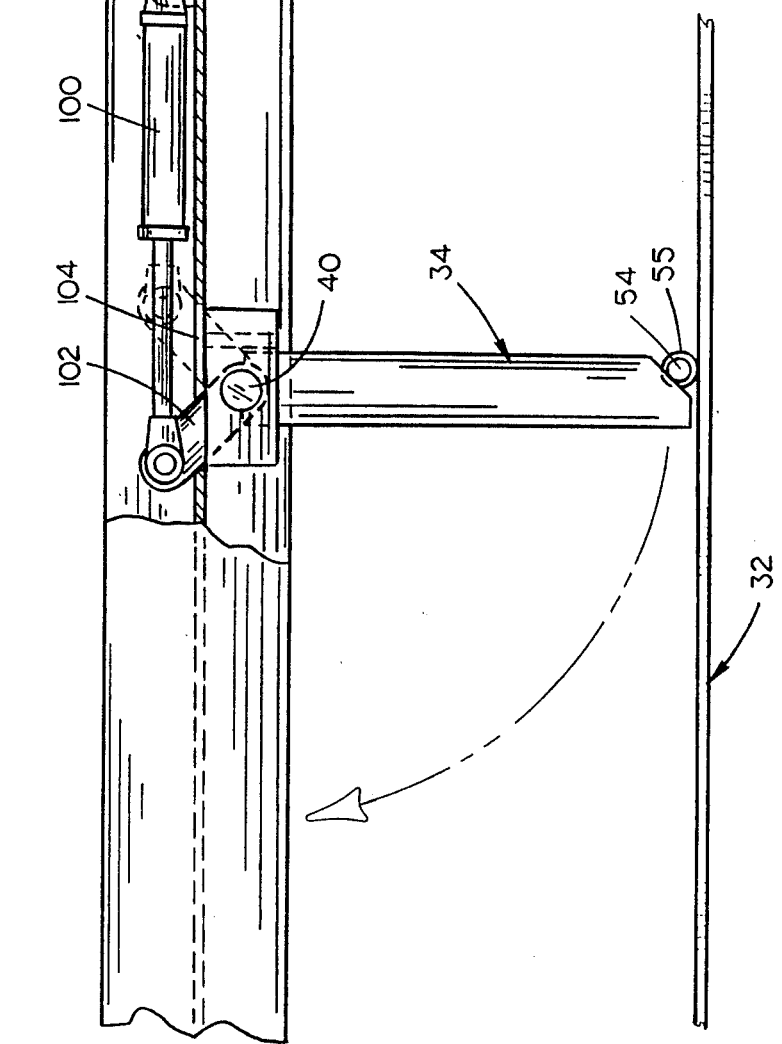
FIG. 9 is is a partial top elevational view illustrating a hydraulic cylinder connected to one of the side extensions for pivotally moving the side extension.

Although the preferred embodiment is to manually position the side extension, the side extension may be moved between its "out" and "in" positions by means of a hydraulic cylinder such as illustrated in FIGS. 9 and 10. In FIG. 9, it can be seen that the base end of a hydraulic cylinder 100 is pivotally connected to the inside surface of web 30 of the frame member 24. The rod end of the hydraulic cylinder 100 has a linkage 102 pivotally connected thereto which is secured to pin 40 located at the inner end of the support arm 34. As seen in FIG. 9, linkage member 102 extends through an opening 104 formed in web 30. Thus, the traction of the rod of the cylinder 100 causes the associated arm member 34 to be pivotally moved in a clockwise direction as viewed in FIG. 9 so that the side extension will be pivotally moved to its "in" position. Conversely, extension of the rod from the hydraulic cylinder 100 will cause the side extension to be pivotally moved outwardly from its "in" position to its "out" position.

I claim:
1. A trailer, comprising,
a wheeled frame means having a forward end, a rearward end, and opposite sides,
said frame means including first and second longitudinally extending side frame members, and first and second swing-out side extension assemblies secured to said first and second side frame members respectively, each of said swing-out extension assemblies comprising a plurality of horizontally disposed and horizontally spaced-apart elongated supports having one end thereof pivotally secured to the associated side frame member, and a rail member pivotally secured to the other ends of said supports, the pivotal connection of said supports to said side frame and said rail member permitting said rail member to be selectively moved from an "in" position adjacent the associated frame member, to an "out" position spaced outwardly of the associated frame member, means for selectively maintaining said rail member in its "in" position, and means for selectively maintaining said rail member in its "out" position, said means for selectively maintaining said rail member in its "in" position comprising at least one loop member secured to the inner surface of said rail member and a spring-loaded locking device operatively secured to the associated frame member which is adapted to engage said loop member and to lock thereonto when said rail member is moved from its said "out" position to its "in" position.

2. A trailer, comprising, a wheeled frame means having a forward end, a rearward end, and opposite sides, said frame means including first and second longitudinally extending side frame members, and first and second swing-out side extension assemblies secured to said first and second side frame members respectively, each of said swing-out side extension assemblies comprising a plurality of horizontally disposed and horizontally spaced-apart elongated supports having one end thereof pivotally secured to the associated side frame member, and a rail member pivotally secured to the other ends of said supports, the pivotal connection of said supports to said side frame and said rail member permitting said rail member to be selectively moved from an "in" position adjacent the associated frame member, to an "out" position spaced outwardly of the associated frame member, means for selectively maintaining said rail member in its "in" position, and means for selectively maintaining said rail member in its "out" position, said means for selectively maintaining said rail member in its "out" position comprising at least one retaining arm removably secured to and extending between the associated frame member and said rail member.

3. A trailer, comprising, a wheeled frame means having a forward end, a rearward end, and opposite sides, said frame means including first and second longitudinally extending side frame members, and first and second swing-out side extension assemblies secured to said first and second side frame members respectively, each of said swing-out side extension assemblies comprising a plurality of horizontally disposed and horizontally spaced-apart elongated supports having one end thereof pivotally secured to the associated side frame member, and a rail member pivotally secured to the other ends of said supports, the pivotal connection of said supports to said side frame and said rail member permitting said rail member to be selectively moved from an "in" position adjacent the associated frame member, to an "out" position spaced outwardly of the associated frame member, means for selectively maintaining said rail member in its "in" position, and means for selectively maintaining said rail member in its "out" position, and a hydraulic cylinder means pivotally secured to and extending between each of said frame members and the associated rail member for pivotally moving said rail members between their "in" and "out" positions.

* * * * *